United States Patent [19]

Faulkner

[11] Patent Number: 4,473,957
[45] Date of Patent: Oct. 2, 1984

[54] DEVICE FOR LOCATING A FRAME HANGER

[76] Inventor: Ronald E. Faulkner, 3224 N. Hwy. 67E, Suite 205, Mesquite, Tex. 75150

[21] Appl. No.: 579,780

[22] Filed: Feb. 13, 1984

[51] Int. Cl.³ .............................................. G01B 3/02
[52] U.S. Cl. .................................. 33/180 R; 33/189; 33/371
[58] Field of Search ..................... 33/180 R, 189, 370, 33/371

[56] References Cited

U.S. PATENT DOCUMENTS

| | | | |
|---|---|---|---|
| 3,516,165 | 6/1970 | Pfeffer | 33/189 |
| 3,530,591 | 9/1970 | Moffitt | 33/180 R |
| 4,241,510 | 12/1980 | Radecki | 33/180 R |
| 4,382,337 | 5/1983 | Bendick | 33/180 R |

FOREIGN PATENT DOCUMENTS 372848 12/1963 Switzerland ..................... 33/180 R Primary Examiner—Willis Little
Attorney, Agent, or Firm—Richard A. Bachand

[57] ABSTRACT

A device to aid in locating a hanger or support on a wall for supporting an object to be mounted at a desired location includes a bracket which temporarily attaches to the frame with a top portion overhanging the top of the frame and a back portion disposed behind the frame. A protrusion extends from the back portion in the direction of the frame to engage the wire or string of the frame, and a frame engaging screw is provided on the top portion to produce tension in the wire or string of the frame in a fashion similar to that existing when the frame is hung. A pin is provided in a channel in the device for producing a mark onto the wall onto which the frame is to be hung, the channel extending from a forwardly accessible location in the top portion to the exact location in the back portion at which the hanger must be attached to the wall to produce the desired location of the hung frame.

11 Claims, 2 Drawing Figures

DEVICE FOR LOCATING A FRAME HANGER

BACKGROUND OF THE INVENTION

1. Field of the Invention

This invention relates to improvements in devices for assisting in hanging frames, pictures, mirrors, and the like, and more particularly to improvements in devices for locating the correct placement of a hanger on a wall or surface to enable such picture or frame to be mounted onto the wall at exactly the desired location.

2. Description of the Prior Art

Practically everyone has experienced the difficulty in hanging a photograph, picture, mirror, or other object at a particular location on a wall; in particular, in locating the precise point at which the hanger should be attached or mounted to the wall to result in the object to be mounted hanging at the desired particular location. Commonly, objects to be mounted have a string or wire stretched across its back and are mounted by attaching a hanger, nail, pin, hook, or the like to the hanger location is usually estimated hanger location is usually estimated or guessed at by first holding the object to be mounted at the desired location then estimating the hanger location by guessing at or estimating the stretched location of the wire or string. Then, usually through an iterative process, the hanger is located, and perhaps relocated, until the precise location of the frame has been achieved. Others have taken a more scientific approach by measuring the extension of the string or wire of the object to be mounted in its tensioned state, then locating the object to be mounted at the desired location and measuring a corresponding distance from the ceiling or floor to the frame or object to be mounted. Even so, due to variables in the parts employed, for example, the width of the particular hangers used, the amount of stretch or give in the wire or string under the weight of the object to be mounted, and so on, unpredictable results are frequently experienced.

Several devices have been proposed, to overcome these problems, as can be seen, for example in any one of U.S. Pat. Nos. 3,530,591; 3,516,165; 4,220,309; 4,241,510; 4,382,337 and 4,413,421. None of the devices known, however, are conveniently mountable onto the frame to be carried by it in use, and none produce a tension state in the hanging device (i.e. wire or string) of the frame similar to that encountered when the frame is actually hung. Thus, for instance, many of the devices require juggling type operations in their use, in which the object to be mounted is held in one hand and the hanger locating device in the other A "third" hand is still required to operate a marker of some sort to produce a mark on the wall at the location indicated by the device.

SUMMARY OF THE INVENTION

In view of the above, it is, therefore, an object of the invention to provide an improved device for locating the point on a wall at which a hanger, nail, hook, pin, or the like, should be attached to result in the object to be mounted hanging at the precise, desired location.

It is another object of the invention to provide a device of the type described which is mountable onto the object to be easily carried thereon in use.

It is another object of the invention to provide a device of the type described which automatically takes into account the size or dimensions of the particular hanger device to be used in hanging the object to be mounted.

It is still another object of the invention to provide a device of the type described which places the wire or string of the object to be mounted in tension in a fashion similar to that encountered when the object is hung.

These and other objects, features, and advantages will be apparent to those skilled in the art from the following detailed description, when read in conjunction with the accompanying drawings and appended claims.

In accordance with a broad aspect of the invention, a device is presented to aid in locating a hanger or support on a wall for supporting an object to be mounted at a desired location. (The object to be mounted can be a picture, frame, mirror or the like, and is referred to hereinafter simply as a frame; and the hanger or support can be a hanger, hook, nail, pin or the like, and is referred to hereinafter simply as a hanger.) The device includes a bracket which temporarily attaches to the frame with a top portion overhanging the top of the frame and a back portion disposed behind the frame. Means projecting from the back portion in the direction of the frame engages the frame supporting means, typically a wire or string, and a frame engaging screw means provided on the top portion produces tension in the frame supporting means in a fashion similar to that existing when the frame is hung. Means are provided in a channel in the device for producing a mark onto the wall onto which the frame is to be hung, the channel extending from a forwardly accessible location in the top portion to the exact location in the back portion at which the hanger must be attached to the wall to produce the desired location of the hung frame.

BRIEF DESCRIPTION OF THE DRAWING

The invention is illustrated in the accompanying drawing, wherein.

In the figures of the drawing, various sizes and dimension have been exaggerated or distorted for ease of description and clarity of illustration. Also, in the figures of the drawing, like reference numerals are used to denote like or similar parts.

DETAILED DESCRIPTION OF THE PREFERRED EMBODIMENTS

Figure 1:
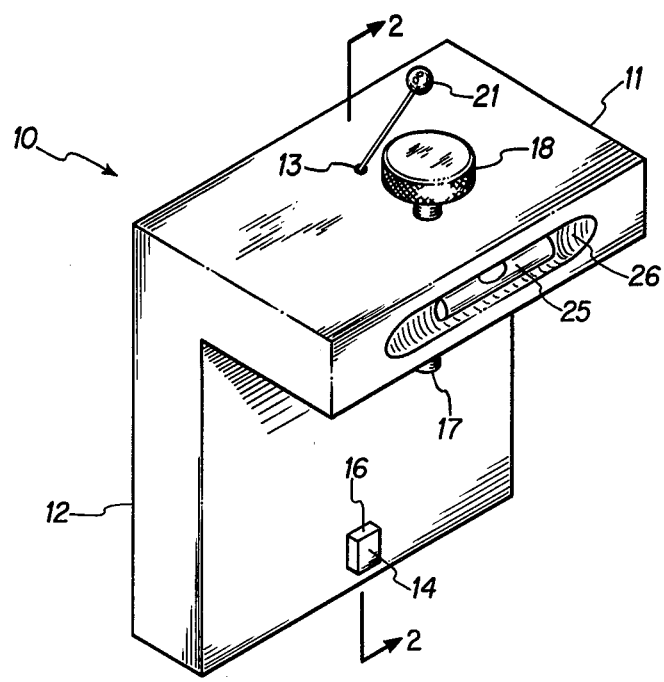
FIG. 1 is a perspective view of the device for aiding in locating a frame support means for supporting the frame at a desired location, in accordance with the invention.

As shown in FIG. 1, the device 10 of the invention is in the form of an "L" shaped bracket having top and back portions 11 and 12, respectively. In the use of the device 10, the top and back portions are locatable above and behind a frame 22 to be hung (see FIG. 2), the manner of which will be described below in detail. The device 10, as will become apparent, is intended for use in hanging picture frames, mirrors, and the like. Although the device 10 is described herein with particular reference to hanging picture frames, it is understood that other similar objects can be hung through its use. More specifically, the device 10 aids in the hanging of a frame or the like by locating on a wall or surface onto which the frame is to be mounted the precise location of the hanger, hook, nail, pin, or other frame hanging means to be used.

A protrusion 14 is mounted on an inside surface of the back portion 12 of the device 10, as shown, and has a top surface 16 on which the wire or string associated with the frame to be hung is received. As will be apparent, in a preferred embodiment of the invention, the protrusion is of dimensions such that its width is approximately equal to the width of the hanger to be mounted on the wall, and of depth approximately equal to the diameter of the wire or string of the frame.

A thumb screw 18 having a threaded portion 17 extending through the top portion of the bracket 10 is provided, approximately centrally located in the top portion and serves the purpose of engaging the frame 22 (see FIG. 2) in use, as will be described below.

Figure 2:
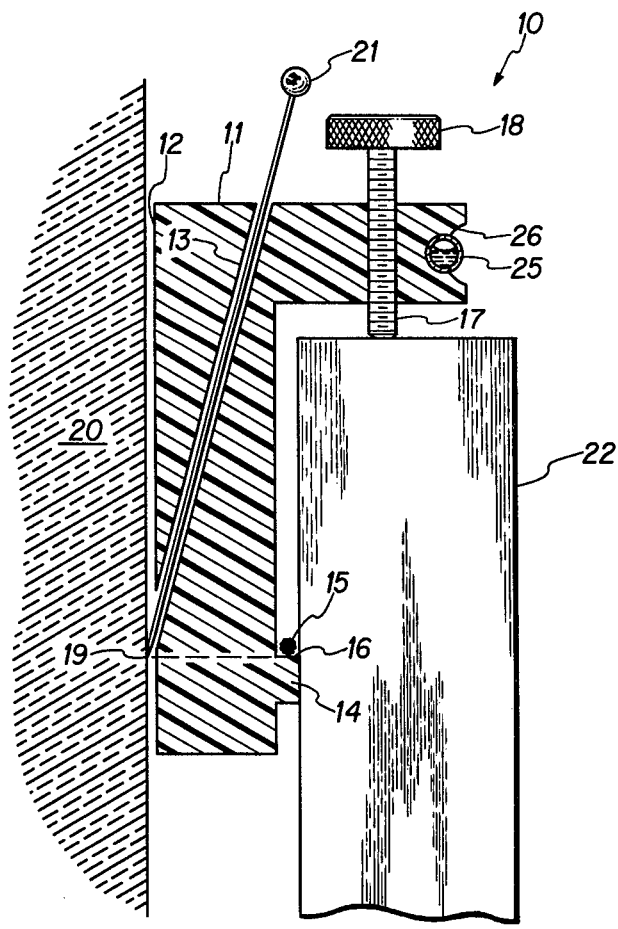
FIG. 2 is a side elevation of the device of FIG. 1, mounted onto a frame or the like to be positioned onto an adjacent surface, through the operation of the device.

A hole or channel 13 is also provided through the device 10, extending from the top surface of the top portion 11 to the back surface of the back portion 12 as shown particularly in FIG. 2, to exit the back portion 12 at a location corresponding to the elevation of the surface 16 of the protrusion 14 on the front face of the back portion 12.

As shown, a bubble level 25 is located in a recess 26 on the front face of the top portion 11 of the device 10 to enable the device 10 and the frame associated with it to be level in use.

With the device fabricate as above, its operation will be described with particular reference to FIG. 2. As shown, the device 10 is mounted onto a frame 22 at a location along its width corresponding to the side-to-side location at which it is desired that the frame hanging means to be attached to the wall would be located when the frame is suspended from it. Typically, frames are mounted at a location at the center of the frame, or, in the case of larger frames, two hangers are sometimes employed to stabilize the frame after it is hung. (In instances where two hangers are desired, two devices 10 are required, one located at each of the respective locations corresponding to the ultimate hanger locations to be determined.) In mounting the device 10 to the frame 22, as can be seen in FIG. 2, the wire or string 15 of the frame is located on the top surface of the protrusion 14 and with the top portion 11 overlying the top of the frame 22. The thumb screw 18 is then operated to bring the screw threaded portion 17 into engagement with the top surface of the frame 22. This operation will have the effect of producing tension in the wire or string 15, as well as in the device 10 between the top and back portions 11 and 12. The device, at this point, is carried by the device 10, so that it can be held in place and visually (or more precisely) located against the surface 20 onto which the frame 22 is to be mounted. When a satisfactory location has been established, the locating pin 21 is inserted into the channel 13 to a point at which it engages the wall 20 at a point 19. The location of the tip of the locating pin 21, by virtue of the positioning of the hole 13 through the device 10, places the tip or point of the locating pin 21 at a level precisely equal to the elevation of the surface 16, but behind the back portion 12 of the device 10. This location corresponds additionally to the bottom surface of the wire or string 15, and is the elevation at which the hanger, hook, nail, or pin, will need to be mounted onto the surface 20 to effect the suspension of the frame 22 at the desired position thus located. Therefore, when the pin 21 is pushed into the block of the device 10, it punctures the surface 20 at the point 19, to leave a small hole or mark at that location. It should be noted that although a locating pin 21 is shown, other marking means can be equally advantageously employed, such as a pencil lead carried in an appropriate container, holder, or other presenting means.

The bubble level 25 can be used to ensure that the frame 22 is level to assist in the placement of the frame 22 at a desired location on the surface or wall 20. This is particularly desirable, for instance, when the frame is being visually located on the wall prior to mounting on it. It should be noted that although a bubble level has been shown for this purpose, other levels and levelling devices can be equally advantageously employed, and, additionally, such devices can conveniently be mounted on the top surface of the top portion 11, or other appropriate location on the device 10.

It should also be noted that although the device has been described and illustrated for the purpose of locating the location of a hanger for engaging a wire or string or similar frame supporting or hanging means, other hanging devices are known and with with the device 10 can be used with little modification, or in some instances, none at all, as will be apparent to those skilled in the art. For example, hangers of sawtooth configuration are widely used, such hangers being mounted the back side of the frame to be hung on a wall. In such structures, the sawtooth configurations serve the function of engaging a nail driven into the wall at an appropriate location to support the picture or frame at the desired location. In such instances, the protrusion 14 can conveniently be formed with a triangular shaped top surface 16, (not shown), so that the triangle can be located in one of the teeth or grooves of the sawtooth hanger (also not shown). The operation of the device would be essentially the same as that above described with respect to a wire oriented embodiment shown.

Depending upon the precision required, it should be noted that the width of the protrusion 14 ideally corresponds to the width of the hanger to be mounted to the wall to engage the wire to support the associated frame. Thus, for example, if the frame hanger were merely a nail or pin, the location indicted by the device 10, although perhaps suitably accurate for many purposes, would not be exact in that the wire or string associated with the frame to be hung would drape differently over the hanger than over a mere nail or pin. Thus, caution should be exercised in designing the particular frame configuration on the wall to insure the location is precisely determined.

In addition to the above, it is apparent that the material from which the device 10 can be made of any convenient material such as plastic, wood, soft metal, or the like. As should be apparent, the particular material of the device is not critical to its operation.

Although the invention has been described and illustrated with a certain degree of particularity, it should be understood that the present disclosure has been made by way of example only and that numerous changes in the arrangement and combination of parts may be resorted to by those skilled in the art without departing from the spirit and the scope of the invention as hereinafter claimed.

I claim:

1. A device for aiding in the hanging of an object having means extending over at least a portion of the back thereof for engaging a wall fastening device from which said engaging means suspends the object, for the purpose of locating the wall engaging device at a desired location, comprising:

a bracket having back and top elements configured to be positionable along the back and top surfaces of the object;

a protrusion on the back portion of the device extending in the direction of the object when the device is emplaced thereon to engage the hanging means at an extension region thereof behind the object;

means for tensioning the device against the object and the hanging means, to configure the hanging means in a manner similar to that existing when the object is hung, engaging the top portion of the object to firmly hold the device thereon;

and marking means locatable in an opening in said device, extending to point at a back surface of said device corresponding to the top of the protrusion engaging the hanging means to mark the wall behind the object when the object is positioned in the desired location.

2. The device of claim 1 wherein said means for marking is a pin locatable in a channel through said device.

3. The device of claim 1 further comprising leveling means carried by said device to provide an indication that the device is level.

4. The device of claim 1 wherein said means for producing tension between said object and hanging means is a screw extending through the top portion of the device for engaging a wall or surface of said object to move said device to place the hanging means into tension.

5. The device of claim 1 wherein said top and back portions are configured into an inverted "L" shape.

6. A device to aid in locating a frame support on a wall for supporting the frame at a desired location comprising:

a bracket locatable on said frame, said bracket having a first portion overhanging a top portion of the frame and a second portion located behind the frame when the bracket is located on the frame;

means on said second portion of said bracket for engaging the frame supporting means;

means carried on said first portion of said bracket for producing tension in said bracket between said frame and said frame supporting hanging means;

means locatable in a channel through said device, said channel extending from a forwardly accessible location to a location corresponding to the location at which the frame supporting engaging means is intended to be located for producing a mark on the wall onto which the frame is desired to be hung.

7. The device of claim 6 wherein said means for producing tension between said frame and said frame supporting hanging means is a thumb screw located in a hole in said first overhanging portion of said bracket operable to raise the bracket with respect to the frame and provide tension in said frame supporting hanging means.

8. The device of claim 6 wherein said means for engaging the frame supporting hanging means is means for engaging a wire mounted behind the frame to be hung.

9. The device of claim 8 wherein said means for engaging the frame wire is of width approximately equal to the width of a hanger from which the frame will be suspended by said wire.

10. The device of claim 6 further comprising means in said first portion overhanging the frame for indicating whether the device is level.

11. The device of claim 6 further comprising means located on said second portion of said device located at a point corresponding to the bottom of the frame supporting hanging means to selectively mark the surface against which the device is located to indicate the location of the means for engaging the frame supporting hanging means.

* * * * *